June 2, 1936.   M. PRÜSS   2,043,119
SLUDGE DIGESTION TANK
Filed Nov. 29, 1933   2 Sheets-Sheet 1
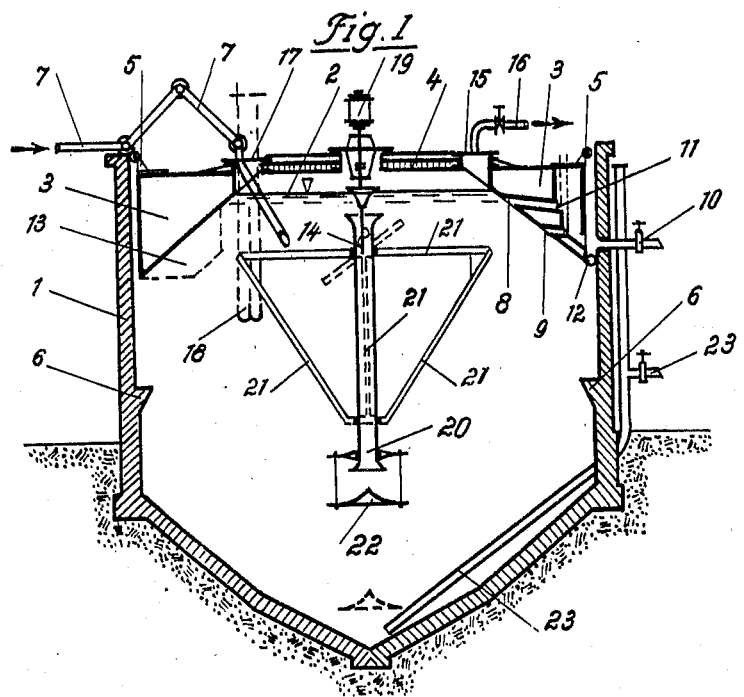
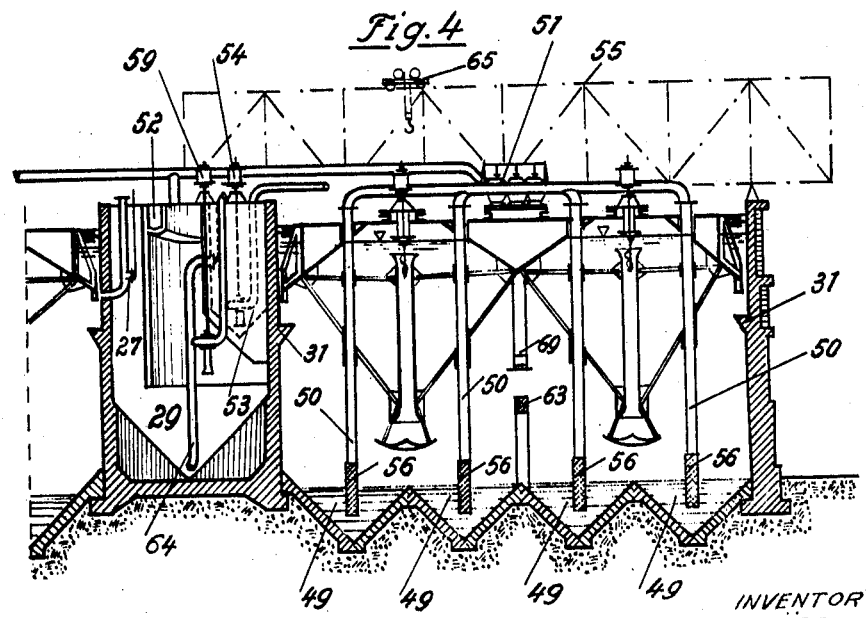
INVENTOR
MAX PRÜSS,
Carl A. Hellmann,
ATTORNEY

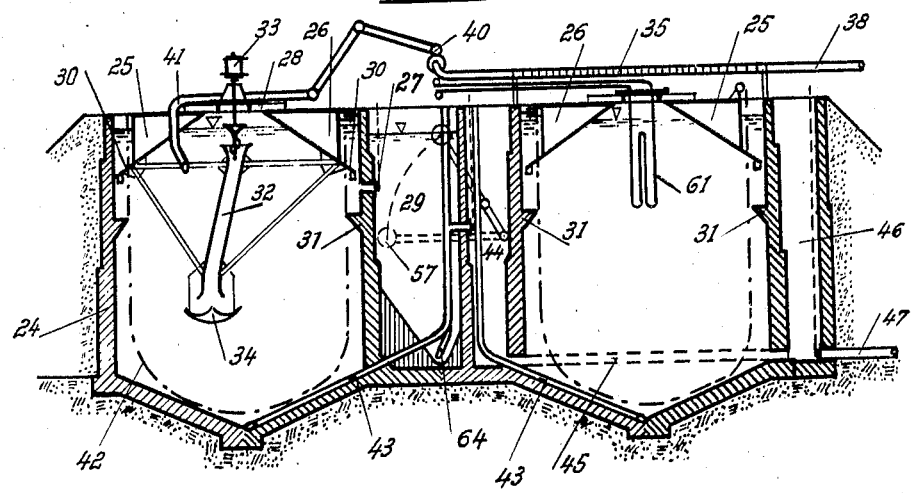
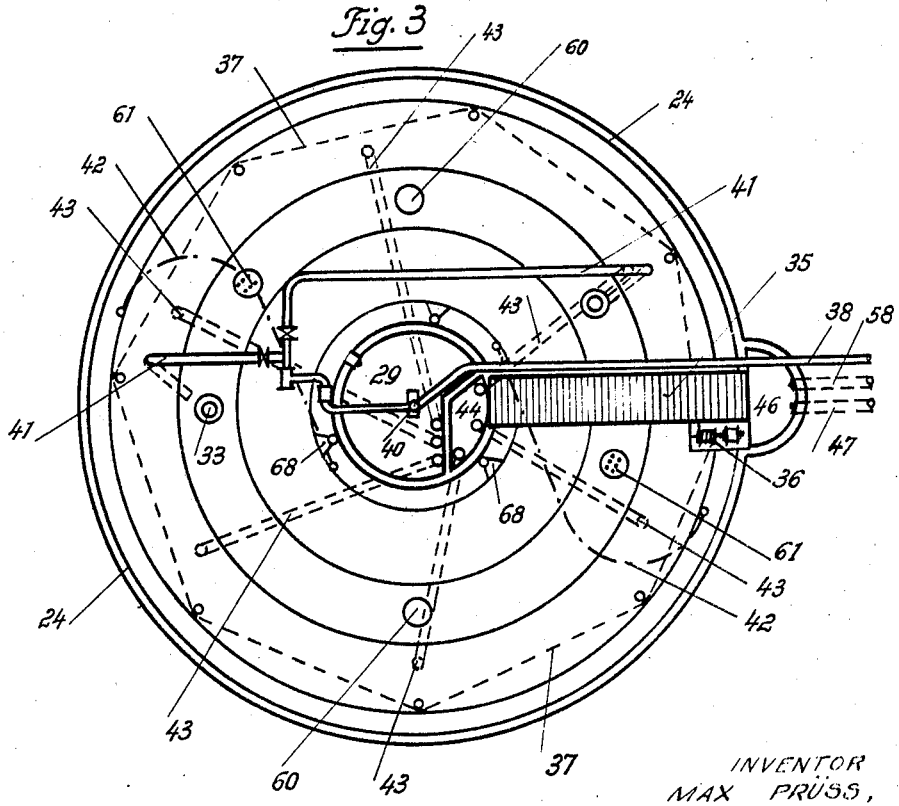

Patented June 2, 1936

2,043,119

UNITED STATES PATENT OFFICE 2,043,119

SLUDGE DIGESTION TANK

Max Prüss, Essen-on-the-Ruhr, Germany

Application November 29, 1933, Serial No. 700,303
In Germany December 3, 1932

11 Claims. (Cl. 210—2)

This invention relates to sewage treatment plants and more particularly to sludge digestion tanks which form part of said plants.

For the collection of the gases given off by sludge digestion tanks it is known to use a floating cover. The constructions of this cover which have so far been carried out may be divided into two groups. In one group of these constructions which had so far been solely used in practice the disk-shaped gas collecting cover rests with its entire base upon the content in the tank and leaves the latter's surface free only underneath the relatively small gas-hood. In this mode of construction it is aimed at to cause the floating sludge which ascends from the digestion tank to always remain submerged to prevent drying and clotting at its free surface. When using such floating covers in connection with relatively large-sized digestion tanks excessive quantities of digestion gases will be carried together at the free surface of the cover underneath the gas-hood with the result that during violent discharge of the gases parts of the floating sludge are carried therewith into said hood which eventually clog up the conduits. In order to attain proper separation of these large quantities of gas from the floating layer of sludge a sufficiently large free surface of sludge must be available. This would, for instance, be the case, if in accordance with the aforementioned second known constuction a gas-hood were used floating upon the sludge in the digestion tank and spanning the entire level of the digestion liquid therein. Although a proposition of this kind has so far only been made in theory, it has heretofore never been carried out in practice, at least not in connection with large-sized digestion tanks. The reason for this may be found in the high cost involved when using a floating layer of sludge freely spanning the entire tank. With greater spans not only the gas-hood itself requires a large amount of structural material but also a complicated and expensive guiding device will be necessary in order to ensure stability of the gas-hood floating upon the level of the sludge and largely projecting out of the latter.

My invention is designed to avoid the aforementioned disadvantages inherent to sludge digestion plants of the present time, essentially by the employment of a floating cover on the sludge which cover is divided up into deeply immersed floating bodies between which flat cover parts are spanned above the level of the sludge, the gas collecting underneath said cover permitting to be drawn off immediately without insertion of a special gas-hood. The ratio between the size of the free surface of sludge spanned by a cover floating in elevated position thereon and that surface which is covered up by the deeply immersed floating bodies must be so chosen that separation of the digestion gases ascending from the digestion space will be possible without carrying with them parts of sludge within said free surface.

The advantages of my invention will be more fully explained in connection with the drawings wherein Fig. 1 is a vertical section through a sludge digestion tank made of concrete and provided with a floating cover;

Fig. 2 is a vertical section of a modified form of digestion tank;

Fig. 3 is a plan view of the digestion tank shown in Fig. 2 and

Fig. 4 is a vertical section of a tank showing a type of construction which is particularly desirable for digestion tanks of large diameter.

The example of construction according to Fig. 1 shows how the aforementioned ratio of surfaces should be approximately chosen. According to Fig. 1 the floating sector-shaped bodies are united into a closed ring near the walls of the digestion tank. In accordance with my present invention furthermore, the ratio of division of the floating cover into floating bodies and elevated cover-parts spanning said bodies may also be chosen different from the aforementioned ratio, if so desire. Dividing up the floating cover, as compared with the heretofore known construction, is in particular connected with important advantages as pointed out in the following. By distributing the buoyancy of the cover over several deeply immersed and spaced floating bodies, as shown for instance in Fig. 1, within a peripheral floating ring, the stability of the cover, as compared with the stability of the floating layer resting with its entire base on the level of the sludge will be so large that a heavy one-sided load would not be able to cause capsizing of the cover. This will result in savings with respect to the guiding devices for said cover. The floating ring which is deeply immersed in order to produce the necessary buoyancy may be regarded as representing a rigid girder in space able to take up, without further auxiliary structural means, at its inner margin the weight of the inner cover above the level of the sludge. The free span of this inner cover, owing to the presence of the outer rigid floating ring, becomes so small that said cover may also be constructed at small cost and sufficiently rigid for the reception of relatively heavy individual loads. Such heavy individual loads may consist of mechanical contrivances for artificially mixing the contents of the tank, said contrivances acting either only upon the layer of floating sludge or also upon the entire content of the tank for mixing in horizontal or vertical direction. Heretofore a contrivance of this kind, owing to its weight and the vibrations caused thereby, could be used only in a condition suspended from fixed gas-collecting hoods and extending into the digestion tank. The heretofore known constructions of floating gas-collecting hoods did not permit to employ contrivances of the aforementioned kind and for this reason it had been impossible to take advantage of accelerating the process of digestion by such contrivances.

The advantages of my invention will be more fully explained in connection with the drawings wherein, as stated, Fig. 1 is a vertical section through a sludge digestion tank made of concrete and provided with a floating cover.

The tank 1 which is of circular conformation in plan-view may also be of any other form and is filled with digestion sludge as far as up to the level 2. The floats 3 which are shown in cross-section immerse deeply into said level and as shown in Fig. 1 are united into a floating ring. The floats are supposed of being of triangular cross-section, this having the advantage that the floating sludge ascending within the tank will be carried together along the oblique under surface of the float towards the small free surface spanned by the gas-hood 4 above the level of the sludge. Within this smaller surface the floating sludge may now be more easily destroyed by artificial means. Guide-rollers 5 are provided for moving the floating ring up and down in vertical direction. Deflecting noses 6 at the interior of the concrete wall of the tank serve to limit downward motion of said floating ring and to deflect the gas bubbles ascending from underneath out of the open gap between the floating ring and the wall of the tank. Fresh sludge is supplied from above in known manner to the tank by means of a movable pressure pipe 7 through the movable cover. This pipe 7, however, may also be fixed on the tank underneath the nose 6 or pass the floating cover in any other known manner. The digestion water which, as a rule, is being withdrawn daily may be carried away by means of pipes passing through the wall of the tank likewise underneath the nose 6 and extending upward to different heights within the tank. In Figs. 1 and 2 two discharge pipes 8 and 9 for digestion water are fixedly built into the floating ring. The upper pipe 8 serves essentially for occasional withdrawal of lighter non-digestable substances from the sludge surface. The under pipe is positioned at the height of the zone of the digestion water. During withdrawing sludge this zone of digestion water moves likewise downward. As the floating ring moves downward evenly with the level of the sludge, the pipe may also be positioned at a height corresponding to the temporary height of the zone of digestion water. The pipes 8 and 9 are connected to the well 11 provided in the floating ring by means of slides which are movable in upward and downward direction and preferably made from wood, said well being in open communication at its under end with the interstice between the floating ring and the wall of the tank through an aperture in the outer wall of the floating ring in its highest floating position opposite said slide 10. A yielding collar 12 moves up and down together with the floating layer and serves to keep the slide 10 solely in communication with the well 11.

In order to enable the floating matter to be fully carried towards the discharge pipe 8 which as much as possible is provided only at one place of the sludge-ring, according to my invention obliquely positioned guide-walls 13 are provided on the under side of said ring. During vertical revolution of the contents in the tank which is effected by means of the pump 14 (more fully described further below) the surface of the contents in the tank is also set into horizontal revolution by action of the guide-walls 13.

A manhole 15 is provided with the horizontal part of the cover of the tank above the level of the sludge as much as possible above the point of discharge of the floating matter through the pipe 8. Upon opening said manhole the discharge of floating matter from the tank may be inspected from the outside. A movable pipe conduit 16 serves to carry away the digestion gas from the manhole 15.

On the other side of the cover there is a second manhole 17 from which heating pipes 18 may be suspended in known manner into the interior of the tank. The heating pipes 18 are connected by means of a flexible hose with a source of heat (not shown). The combination of this heating device with the floating cover is in a technical respect especially favorable, because the heating pipes also during downward motion of the sludge level remain fully immersed into the digestion water, therefore always offering the full heating surface for proper transition of heat from the pipes to the sludge.

Within the central axis of the floating cover there is furthermore provided as the heaviest individual load, for instance, a known device for vertically revolving the contents of the container by means of a pump 14. 19 is a driving motor mounted above the cover and 20 the ascending pipe for the sludge, the propeller of said pump working within said ascending pipe at the upper end thereof. On account of the upward and downward motion of the floating cover this ascending pipe must also be suspended from the floating ring. According to my invention this is accomplished by means of a lattice work in space, 21. This lattice work 21 may be secured to the floating ring in any suitable manner, for example by means of the flanges 39 secured to the floats 3. The pipe 20 may be supported by the lattice work 21 at two spaced points, as shown, for instance, at 48 and 62. This rigid connection of the ascending pipe with the floating ring, as compared with a digestion tank having a fixed cover, is connected with the advantage that the level of the sludge in the tank is always at a proper height with respect to the outlet of the pump 14.

The under end of the sludge ascending pipe is equipped in known manner with an horizontal baffle-plate 22 which is likewise suspended from said ascending pipe. At normal height of the sludge in the tank the baffle-plate 22 is positioned at such a height above the sole of the tank that a sufficiently large part of the sludge in the funnel-shaped sole will not participate in the vertical revolving motion so that the mature sludge may properly consolidate at this place before being withdrawn from the tank. Withdrawal of the consolidated sludge from the undermost point of the sole is effected by means of over-pressure water in the pipe 23.

In case excessively consolidated sludge should not sufficiently slide on the inclined surfaces of the sole which in time would result in the formation of relatively solid deposits of sludge, the suspension of the sludge revolving pump 14 from the floating ring will represent an especially simple and valuable auxiliary in order to remove such solid deposits of sludge during operation of the plant. It will only be necessary to lower the floating ring as far as into its undermost position by occasionally letting off sludge or sludge water. Now the under baffle-plate 22 will come as far as into the undermost point of the funnel-shaped side, as indicated in dotted lines in Fig. 1. In this case the propeller of the pump 14 only needs to be rotated in opposite direction to revolve the sludge from above towards below and to wash off even most solid deposits of sludge from the sole by action of the thus developed scavenging force. Moreover, said deposits of sludge may be floated up so heavily that they may be withdrawn from the tank in normal manner through the sludge discharge pipe 23.

Fig. 1 represents only an example of a construction forming part of my invention; instead of the pump 14 there may also be used any other device for revolving the sludge in horizontal or vertical direction or for destroying the floating layer of sludge.

In digestion tanks of greater diameter the combining of the floating bodies into a single closed floating ring will not be sufficient to cover up the entire surface of the tank with the desired small span of the cover which floats freely above the level of the sludge. In such cases the floating bodies may be combined into several floating rings and the horizontal parts of the cover may span said several floating rings.

An example of an arrangement of this kind is shown in Fig. 2 in vertical cross-section and in plan-view in Fig. 3. The circular digestion tank 24 is again supposed to be made from reinforced concrete. The floating cover consists of two concentrically arranged floating rings 25 and 26, the horizontal gas-collecting hood 28 spanning the interstice between said rings above the level of the sludge. In this construction moreover, a well 29 of concrete is mounted at the central part of the circular digestion tank, said well serving for subsequent clarification of the drawn-off digestion water. The floats of floating rings 25 and 26 do not extend as far as immediately to the vertical wall of the tank and the interstice between the vertical wall of the float and said wall of the tank is covered up by a gas-collecting screen 30 mounted below the level of the sludge. This screen 30 is so arranged that the ascending gas-bubbles and sludge-matter may be carried as far as to the free sludge surface underneath the gas-cover above said surface. An arrangement of this kind prevents formation of unnecessarily large floating bodies whose excessive buoyancy would have to be counteracted by ballast applied to said bodies. 32 again represents a sludge ascending pipe which is open at its upper and under end, this pipe serving to revolve the contents of the tank in vertical direction, 33 represents the driving motor for the sludge revolving device and 34 the under baffle-plate which is movable in upward and downward direction together with the ascending pipe suspended from the cover. The tank space underneath the baffle-plate 34 is outside the range of revolving motion and serves for consolidating the digested sludge.

In the heretofore usual construction of digestion tanks having a floating cover which is only movable in vertical direction in case of a tank of larger diameter a large number of such mixing devices must be mounted within the tank, because the range of action of such mixing devices is limited to a radial distance of only about 10 m. By my invention it will be possible to attain satisfactory results with only one or two such mixing devices 33, this being accomplished by having the floating cover equipped with devices permitting said cover to be rotated in horizontal direction. A winch 36 which may be electrically driven is mounted for this purpose on the fixed bridge 35 leading from the central well 29 to the wall 24, said winch permitting to operate the rope or chain 37 laid around the cover thereby rotating the latter. Centering of said cover in the present case is effected by three guide-rollers 68 which roll off horizontally on the outer surface of the central well. The power required for imparting slow motion even to a very large floating cover is extremely small as no friction whatever has to be overcome. The constructions shown in Figs. 2 and 3 are supposed to operate in such a way that the cover makes a half revolution in about from two to three hours and again returns in the same time along the same way. Fresh sludge is supplied by the pipe 38 through the articulated pipe members indicated at 40 to the conduits 41, said fresh sludge being thus always carried into the range of action of the mixing pump 32.

The fact that the floating cover is movable in horizontal direction results in considerable savings regarding the construction of the concrete work. The sole of the tank does no more need to be subdivided into several pointed funnels, the construction of such funnel-shaped soles for large tank units involving considerable costs as it will be necessary to work the sole deeply into the ground. Instead of funnels in the sole it will be sufficient to provide sludge-grooves therein, said grooves having preferably slightly inclined lateral surfaces. As shown in Figs. 2 and 3 there will be the possibility of using suspended heavy chains 42 or similar flexible scratching devices extending as far as down to the sole of the tank. Upon rotation of the cover a device of this kind serves to shove together the heavy bottom sludge at the undermost point of the sludge-groove. In the construction represented in Fig. 2 there are six sludge discharge pipes 43 for withdrawing the mature sludge from the undermost point of this sludge-groove, said pipes 43 leading all towards the sludge discharge well 44 which is separated from the central well 29. From the wells 44 the pipe 45 carries the sludge into the outer distributing well 46 from which it flows through the pipe 47 to the drying beds.

In case of digestion tanks of still greater diameter, as assumed in the construction shown in Fig. 4 (which diameter in practice may be about from 40 to 50 m.) the bottom of the tank is preferably divided up into several sludge-grooves 49 and the mature sludge is lifted from said grooves by the sludge pipes 50 which are suitably suspended in vertical direction from the cover of the tank towards the latter by means of a sludge-pump 51. The pump 51 subsequently carries the sludge through a pressure conduit with the aid of the circular groove 52 in the middle sludge collecting space 53 from which the sludge is moved forward past the service-bridge 55 to the drying beds by means of a vertical sludge pump 54. By so arranging the vertical sludge discharge pipes 50 which rotate together with the cover the entire sole of the tank will be safely freed from matured sludge. The under part 56 of these sludge pipes must now be made flexible or in some way movable in height for the purpose of moving the ends of these pipes out of the way during downward motion of the cover of the tank.

In the Fig. 4 type of construction floats 3 are provided similar to those used in the other forms and here again the vertical pipes 20 are supported by lattices or frame works 21 carried by the floating covers. In this figure 19 are driving motors mounted above the cover and operate the propellers 66 within the pipes 20, as in the Fig. 1 form. 22, 22 are horizontal baffle-plates supported below the respective pipes 20 in any desired manner.

Digestion water is removed from the digestion tank in that it is carried through slides 27 provided on the vertical wall of the central well into that central well 27 which is first to be emptied (Fig. 2). In this central well the sludge carried with said water is deposited on the sole of the tank and carried through the pipe 64 into the sludge discharge well 44 or 53. Subsequent to being clarified, in the construction shown in Fig. 2 the digestion water is carried through the vertically swingable float pipe 57 into the discharge well 44 and from here through pipe 45 past the distributing well 46 into the discharge conduit 53. In the construction shown in Fig. 4 the clarified digestion water is pumped from the central well 29 through the vertical pump 59 past the service-platform 55.

The floating cover of the tank is further equipped as usual with gas-hoods 60 and with heating pipes 61 suspended therein. Discharge of the gases and supply of heating water is effected in the usual way by means of articulated pipes provided at the center of the circular tank. The connection between the suspended heating pipes and the horizontally movable cover of the tank is connected with the important advantage that during rotation of the cover the heating pipes come alway in contact with other quantities of colder digestion water. This secures proper transition of heat from the heating pipes to the digestion water, thereby dispensing with special circulating pumps for the latter. From Fig. 4 it may be seen that with the assumed large diameter of the tank two mixing pumps will be necessary in order to mix the sludge over its entire surface. The floating layer in the present case consists of three concentrically arranged floating rings. The two outer rings upon downward motion of the floating cover will find an under abutment on the concrete collar 31. For supporting the middle floating ring in this undermost position there are provided supports 69 suspended from said middle floating ring which will come to rest on the concrete ring 63 supported by the sole of the tank.

On the upper girder of the service-platform 55 as shown in Fig. 4 a travelling crane 65 is mounted displaceably on said girder, said travelling crane projecting towards both sides beyond said platform. By means of this travelling crane the mixing pumps, the sludge discharge pipes as well as the heating pipes may be drawn out of the tank from time to time for the purpose of inspection. In the arrangement according to Fig. 4 it is likewise assumed that the aforementioned accessories are arranged in two radii so that the service-platform needs only be rotated at a time through 180°. After rotation of said platform through 180° from the position shown in Fig. 4 the operating devices arranged in the other radius will come into the range of action of the travelling crane 65 and may likewise be drawn out by the latter for purposes of inspection and deposited outside of the tank.

I claim:

1. A sludge digestion tank and a cover for said tank, said cover adapted to float upon the level of the sludge in said tank and composed of a floating body deeply immersed in said sludge, said floating body being disposed to leave free a sufficiently large surface for free de-gassing, said large surface being closed gas-tight by parts of said cover, a draft tube carried by said cover, said tube being mounted eccentrically on said cover, means for circulating said sludge through said tube and thence outwardly and vertically beneath said cover, and a contrivance associated with said cover for imparting horizontal rotary movement thereto.

2. A sludge digestion tank and a cover for said tank, said cover adapted to float upon the level of the sludge in said tank and composed of a floating body deeply immersed in said sludge, said floating body being disposed to leave free a sufficiently large surface for free de-gassing, said large surface being closed gas-tight by parts of said cover, a heating pipe carried by said cover, said heating pipe being mounted eccentrically on said cover, and a contrivance associated with said cover for imparting horizontal rotary movement thereto.

3. A sludge digestion tank and a cover for said tank, said cover adapted to float upon the level of the sludge in said tank and composed of a floating body deeply immersed in said sludge, said floating body being disposed to leave free a sufficiently large surface for free de-gassing, said large surface being closed gas-tight by parts of said cover, a draft tube carried by said cover, said tube being mounted eccentrically on said cover, means for circulating said sludge through said tube and thence outwardly and vertically beneath said cover, a heating pipe carried by said cover, said heating pipe being mounted eccentrically on said cover, and a contrivance associated with said cover for imparting horizontal rotary movement thereto.

4. A sludge digestion tank and a cover for said tank, said cover adapted to float upon the level of the sludge in said tank and composed of a floating body deeply immersed in said sludge, said floating body being disposed to leave free a sufficiently large sludge surface for free de-gassing, said large surface being closed gas-tight by parts of said cover, the bottom of said floating body being steeply inclined with respect to said free sludge surface, a draft tube carried by said cover, said tube being mounted eccentrically on said cover, means for circulating said sludge through said tube and thence outwardly and vertically beneath said cover, and a contrivance associated with said cover for imparting horizontal rotary movement thereto.

5. A sludge digestion tank and a cover for said tank, said cover adapted to float upon the level of the sludge in said tank and composed of a floating body deeply immersed in said sludge, said floating body being disposed to leave free a sufficiently large sludge surface for free de-gassing, said large surface being closed gas-tight by parts of said cover, the bottom of said floating body being steeply inclined with respect to said free sludge surface, a heating pipe carried by said cover, said heating pipe being mounted eccentrically on said cover, and a contrivance associated with said cover for imparting horizontal rotary movement thereto.

6. A sludge digestion tank and a cover for said tank, said cover adapted to float upon the level of the sludge in said tank and composed of a floating body deeply immersed in said sludge, said floating body being disposed to leave free a sufficiently large sludge surface for free de-gassing, said large surface being closed gas-tight by parts of said cover, the bottom of said floating body being steeply inclined with respect to said free sludge surface, a draft tube carried by said cover, said tube being mounted eccentrically on said cover, means for circulating said sludge through said tube and thence outwardly and vertically beneath said cover, a heating pipe carried by said cover, said heating pipe being mounted eccentrically on said cover, and a contrivance associated with said cover for imparting horizontal rotary movement thereto.

7. A sludge digestion tank and a cover for said tank, said cover adapted to float upon the level of the sludge in said tank and composed of a floating body deeply immersed in said sludge, said floating body being disposed to leave free a sufficiently large surface for free de-gassing, said large surface being closed gas-tight by parts of said cover, sludge discharge pipes associated with the tank, a contrivance associated with said cover for imparting horizontal rotary movement thereto and scraping members adapted to slide on the tank bottom during motion of said cover and to push the sludge deposited on said bottom to move it into the range of action of said sludge discharge pipes.

8. A sludge digestion tank and a cover for said tank, said cover adapted to float upon the level of the sludge in said tank and composed of a floating body deeply immersed in said sludge, said floating body being disposed to leave free a sufficiently large sludge surface for free de-gassing, said large surface being closed gas-tight by parts of said cover, the bottom of said floating body being steeply inclined with respect to said free sludge surface, a contrivance associated with said cover for imparting horizontal rotary movement thereto, sludge discharge pipes associated with the tank, and scraping members adapted to slide on the tank bottom during motion of said cover and to push the sludge deposited on said bottom to move it into the range of action of said sludge discharge pipes.

9. In a sludge digestion tank, the combination of a cover for said tank, said cover adapted to float upon the level of the sludge in said tank and composed of individual floating bodies deeply immersed into said sludge, said floating bodies being disposed to leave free a sufficiently large sludge surface for free de-gassing, the interstices between said floating bodies being closed up gas-tight by parts of said cover, the bottom of said floating bodies being steeply inclined against said free sludge surface, machine means rigidly connected to said cover, said machine means operating to agitate and mix the sludge contained in said tank, pipes extending from the horizontally movable cover as far as almost to the tank sole, and a lifting device associated with said pipes, said lifting device adapted to draw off mature sludge deposited on said sole during motion of said cover, the under end of said pipes being adjustable as to their height with respect to said cover.

10. A sludge digestion tank and a cover for said tank, said cover adapted to float upon the level of the sludge in said tank and composed of a floating body deeply immersed in said sludge, said floating body being disposed to leave free a sufficiently large surface for free de-gassing, said large surface being closed gas-tight by parts of said cover, sludge discharge pipes associated with the tank, machine means rigidly connected to said cover, said machine means comprising means to agitate and mix the sludge in said tank, a contrivance associated with said cover for imparting horizontal rotary movement thereto and scraping members adapted to slide on the tank bottom during motion of said cover and to push the sludge deposited on said bottom to move it into the range of action of said sludge discharge pipes.

11. A sludge digestion tank and a cover for said tank, said cover adapted to float upon the level of the sludge in said tank and composed of a horizontally rotatably movable floating body deeply immersed in said sludge, said floating body being disposed to leave free a sufficiently large sludge surface for free de-gassing, said large surface being closed gas-tight by parts of said cover, the bottom of said floating body being steeply inclined with respect to said free sludge surface, machine means rigidly connected to said cover, said machine means comprising means to agitate and mix the sludge contained in said tank, pipes extending from the horizontally rotatably movable cover almost to the tank bottom, and a lifting device associated with said pipes, said lifting device adapted to draw off mature sludge deposited on said bottom during motion of said cover, the lower ends of said pipes being adjustable as to their height with respect to said cover.

MAX PRÜSS.